UNITED STATES PATENT OFFICE 2,200,423

MONOAZO DYESTUFFS AND THEIR MANUFACTURE

Adolf Krebser, Riehen, near Basel, Switzerland, assignor to the firm J. R. Geigy A. G., Basel, Switzerland No Drawing. Application November 4, 1938, Serial No. 238,893. In Switzerland November 13, 1937

5 Claims. (Cl. 260—163)

This invention relates to the manufacture of monoazo dyestuffs and enables dyestuffs with qualities superior to those of the known similar ones to be produced.

Monoazo dyestuffs produced from diazotized o- and p-aminophenol alkyl ethers, wherein the alkyl radicals are low molecular, for example methyl and ethyl, and suitable coupling components are well known in large numbers.

Research has now surprisingly revealed that o- and p-aminophenol alkyl ethers, of which the alkyl groups contain eight or more carbon atoms, are extremely appropriate for the production of monoazo dyestuffs which are characterized by a better fastness to fulling and better drawing power when dyeing from the neutral bath, in comparison with similarly built-up known dyestuffs containing low alkylated aminophenol ethers.

Diazo and azo components can be appropriately substituted, for example by halogen or alkyl groups, but the azo component must contain at least one sulphonic acid group.

The new o- and p-aminophenol alkyl ethers can be produced by usual methods, for example by treating the o- and p-nitrophenol alkali salts with the halides of higher alcohols in appropriate solvents and diluents, such as amyl alcohol, if necessary under pressure and subsequent reduction.

The following examples illustrate the invention, the parts being by weight:

Example 1

27.7 parts of o-aminophenol dodecyl ether are dissolved in 100 parts of 95% ethyl alcohol and 35 parts of concentrated hydrochloric acid and diazotized at 10° C. with 7 parts of nitrite. The diazonium compound is allowed to flow into an ice-cold ammoniacal solution of 43 parts of 1-benzoylamino-8-hydroxynaphthalene-3:6-disulphonic acid. The formation of the dyestuff is completed in a few hours. It is filtered, pressed and dried. The new dyestuff, a dark red powder, dissolves in hot water with a clear blue-red color and in concentrated sulphuric acid with a reddish-blue color. It dyes wool and silk from acid and neutral bath blue-red shades fast to fulling.

Instead of the 1-benzoylamino-8-hydroxynaphthalene-3:6-disulphonic acid the analogous p-toluene-sulphonyl or acetyl compounds may be used; the 1-amino-8-hydroxynaphthalene-3:6-disulphonic acid may also be replaced by the 1-amino-8-hydroxynaphthalene-4:6-disulphonic acid. These acyl-compounds give also dyestuffs of similar properties with the diazotized o- or p-aminophenol octyl ether.

Example 2

22.1 parts of o-aminophenol octyl ether are dissolved in 100 parts of 95% alcohol and 35 parts of concentrated hydrochloric acid, and diazotized at 10° C. with a concentrated aqueous nitrite solution containing 7 parts of $NaNO_2$. The diazonium compound is coupled in ammoniacal solution ice-cold with 33 parts of 2':5'-dichlorophenylmethylpyrazolone-4'-s u l p h o n i c  a c i d. After a few hours, the completely formed dyestuff is filtered and dried. It is a yellow powder, dissolves in water with a clear yellow color, in concentrated sulphuric acid with an orange-red color and dyes wool and silk from acid and neutral bath yellow shades fast to fulling.

Instead of the above mentioned octyl ether the corresponding dodecyl ether may be used and instead of the 2':5'-dichlorophenylmethylpyrazolone-4'-sulphonic acid the monochlorinated compound or the phenylmethylpyrazolone m- or p-sulphonic acids may be employed.

Example 3

36.1 parts of p-aminophenol octodecyl ether are diazotized as in Example 1 and coupled with an ammoniacal cold solution of 31 parts of 1-hydroxynaphthalene-3:6-disulphonic acid. The filtered and dried dyestuff forms a red powder. It dissolves in water with a red color, in concentrated sulphuric acid with a red violet color and dyes wool and silk fast red shades.

With the corresponding o-aminophenol ether similar dyestuffs are obtained, also if 2-hydroxynaphthalene-6:8-disulphonic acid is coupled with the diazo compounds of the o- and p-aminophenol octodecyl ether.

What I claim is:

1. Monoazo-dyestuffs corresponding to the following formula

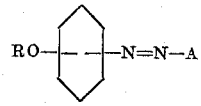

wherein R means an alkyl radical with at least 8 carbon atoms and A the radical of a coupling component selected from the group consisting of naphthol sulphonic acids, N-acylated peri-aminonaphthol sulphonic acids and phenyl methyl pyrazolone sulphonic acids.

2. Monoazo-dyestuffs corresponding to the following formula

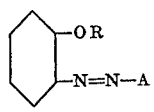

wherein R means an alkyl radical with at least 8 carbon atoms and A the radical of a coupling component selected from the group consisting of naphthol sulphonic acids, N-acylated peri-aminonaphthol sulphonic acids and phenyl methyl pyrazolone sulphonic acids.

3. The monoazo-dyestuff corresponding in the free state to the following formula

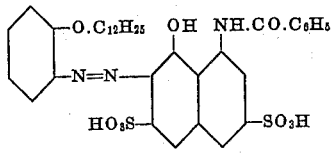

being a dark red powder, dissolving in hot water with a clear blue-red color and in concentrated sulphuric acid with a reddish blue color and dyeing wool and silk from acid and neutral bath blue-red shades fast to fulling.

4. The monoazo-dyestuff corresponding in the free state to the following formula

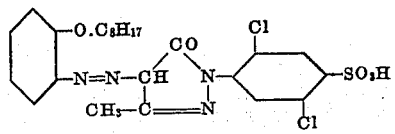

being a yellow powder, dissolving in water with a clear yellow color, in concentrated sulphuric acid with an orange-red color and dyeing wool and silk from acid and neutral bath yellow shades fast to fulling.

5. The monoazo-dyestuff corresponding in the free state to the following formula

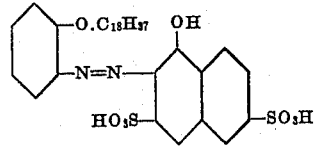

being a red powder dissolving in water with a red color, in concentrated sulphuric acid with red-violet color and dyeing wool and silk fast red shades.

ADOLF KREBSER.